Feb. 11, 1964   D. J. GREILING   3,120,883
SECTIONAL SHUTTER
Filed May 13, 1960
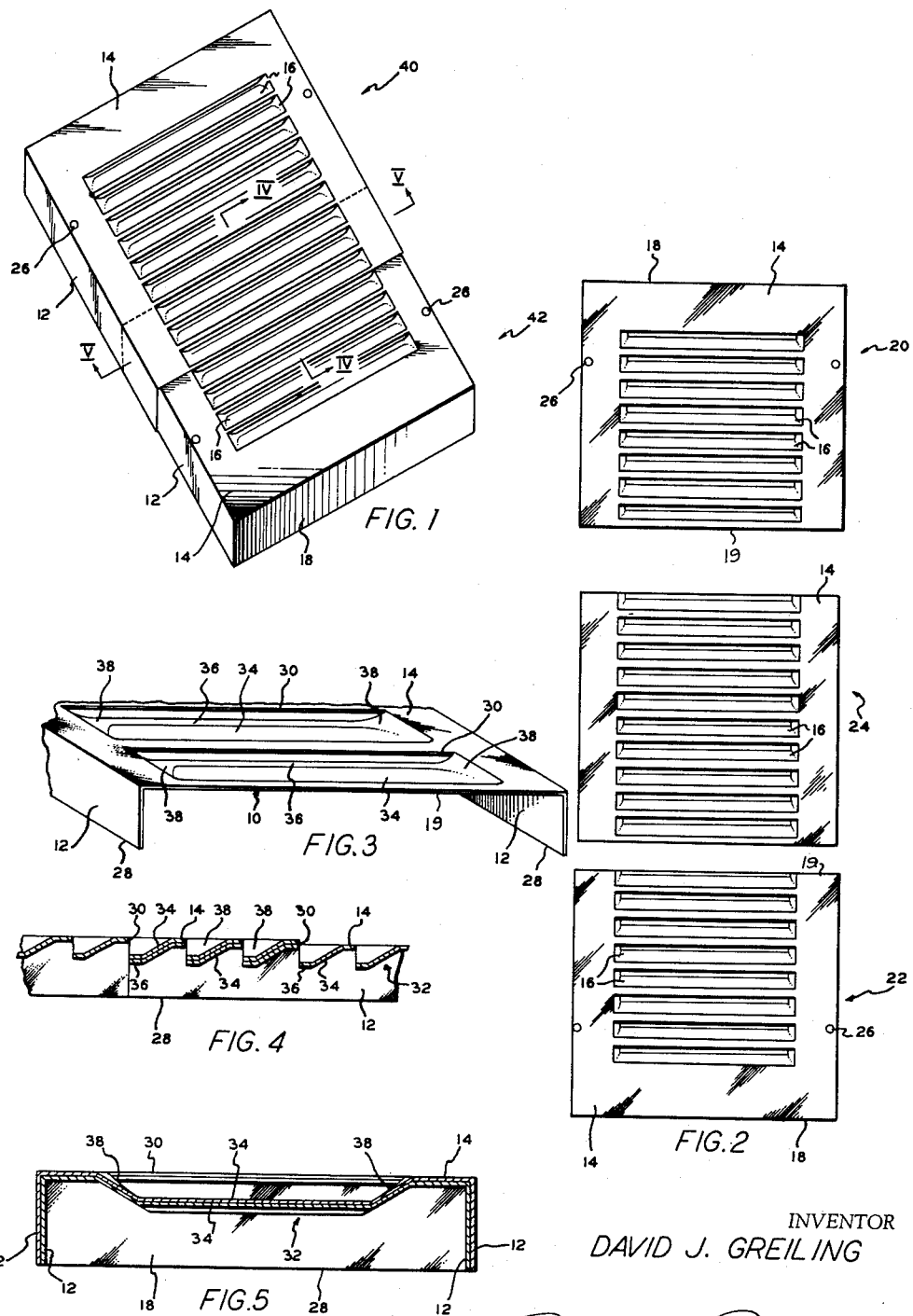
INVENTOR
DAVID J. GREILING
BY Beaman & Beaman
ATTORNEY

United States Patent Office 3,120,883
Patented Feb. 11, 1964

3,120,883
SECTIONAL SHUTTER
David J. Greiling, Hillsdale, Mich., assignor, by mesne assignments, to Lyf-Alum, Inc., Oconomowoc, Wis., a corporation of Wisconsin
Filed May 13, 1960, Ser. No. 29,033
3 Claims. (Cl. 189—63)

The invention pertains to a shutter construction of a sectional type wherein shutters of various longitudinal dimensions may be produced with a minimum number of components.

It is an object of the invention to provide a shutter construction as used in the building and ornamental arts wherein the shutter may be readily adjusted to the desired length and wherein the shutter consists of at least a pair of complementary components which may be assembled in any one of a number of selective arrangements which varies the shutter length without affecting the uniform appearance thereof.

A further object of the invention is to provide a shutter construction consisting of a plurality of louvered components wherein the components may be assembled such that selected louvers thereof assemble in a nesting relationship.

A further object of the invention is to provide a shutter construction of attractive appearance which permits a variety of uses with a minimum of components wherein supply inventories may be kept to a minimum and the shutter may be quickly custom sized for the particular application.

These and other objects of the invention arising from the structural arrangement and details of an embodiment thereof will appear from the following description and accompanying drawings wherein:

FIG. 1 is a perspective view of a two-part sectional shutter in accord with the invention in assembled relationship, FIG. 2 is a plan exploded view of the components employed in assembling a three-section shutter in accord with the invention, FIG. 3 is a perspective view of the inner end of a shutter section in accord with the invention, FIG. 4 is a sectional elevational view taken along section IV—IV of FIG. 1 and FIG. 5 is an elevational sectional view taken along section V—V of FIG. 1.

The shutter in accord with the invention is preferably formed of a lightweight sheet metal and is primarily for purposes of ornamentation in the building art, however, the invention may be used to cover vent openings and for other similar utilitarian purposes.

The components of the shutter are formed of a sheet material having a central region 10 and having the longitudinal edges thereof deformed in a common direction to provide flanges 12. The flanges 12 are perpendicular to the central planar region 10 which defines a planar surface 14 in which a plurality of spaced parallel louvers 16 are formed. In the sectional shutter the outer ends of the shutter are likewise deformed to define end flanges 18, FIG. 1, and the inner end 19 of the end components 20 and 22 are open as shown in FIG. 3. In a central component as 24 of FIG. 2, both of the ends of the component are left open in the manner of FIG. 3.

When assembled, the shutter is mounted upon the supporting surface of the building, or other article to which the shutter is attached, by means of screws passing through holes 26 defined on the surface 14 of the shutter components such that the edges 28 of the flanges are firmly engaged in contact with the supporting surface and it will be appreciated that the surface 14 will then be in parallel relation to the supporting surface and spaced therefrom a distance equal to the height of the flanges.

The louvers 16, defined on the end components 20 and 22 and the central component 24 are all identical in size and configuration and may be formed on the same die. The louvers, as best shown in FIGS. 3 through 5, are formed by slitting the surface 14 transversely at 30 and deflecting the portion 32 adjacent one side of the slit downwardly as shown in these figures. The downwardly deflecting louver portion 32 consists of a generally inclined surface which extends transversely across the shutter component and specifically consists of the inclined surface 34 terminating at the lower regions in a horizontal portion 36, FIG. 4. The inclined surface 34 intersects the surface 14 of the component. The lateral ends of the downwardly inclined louver portion 32 consists of surfaces 38 which converge inwardly and downwardly and are slightly radiused as to blend into the horizontal portions 36 and the extreme ends of the slit 30, note FIG. 3. It will, thus, be appreciated that the louvers 16 are formed with inwardly converging portions such that the louvers of one shutter component may nest within the louvers of a lower shutter component as shown in FIG. 4.

That the louvers 16 of the shutter components may assemble in a nesting relationship, it is, of course, necessary that the longitudinal flanges 12 of one of the shutter components be spaced apart a greater distance than the flanges of the contiguous shutter component whereby one of the shutter components may be received between the flanges of other shutter components. It is also desired that the flanges of the narrower component be less in height than those of the wide component by the dimension of the thickness of the sheet metal. In the embodiment of FIG. 2 where three components are employed the end components 20 and 22 have flanges spaced apart such as to receive the shutter of component 24 therebetween, and in FIG. 1 the flanges 12 of the component 40 are spaced apart further than the flanges of component 42.

In assemblying the shutter components of FIG. 1, the shutter component 42 is inserted between the flange of the shutter component 40 and is axially located relatively thereto such that the overall length of the assembled shutters is as desired. The louvers of the two components may now be nested, FIG. 4, such that the two components assume the appearance of FIG. 1, e.g., that of a single unitary structure, which may be attached to the structure as desired. It will be noted from FIGS. 2 and 4 that the inner end of the component having the lesser flange separation is defined at the end of the horizontal portion 36 and the inner end of the other component is terminated at the location of a slit 30 whereby upon assembling the components such that the severed ends of the louver portions 38 of the wider component abut the slit 30 of the narrower component a uniform and consistent louvered appearance is maintained. With longer shutters the embodiment of FIG. 2 may be employed wherein three components assembled together in the above described relationship will produce a shutter of considerable length and it will be apparent by using four or five or more components, shutters of any desired length may be produced.

It will, thus, be appreciated that the invention results in a shutter construction which is of simple and low cost manufacture that provides an attractive shutter which may be easily adjusted to a desired dimension to accommodate the particular application. The louvers are so formed and spaced upon the shutter components that upon assembly the shutter appears to be formed of a single member rather than a plurality of components and, hence, a uniform and attractive appearance is maintained.

It will be understood that embodiments other than those disclosed may be apparent to those skilled in the art without departing from the spirit and scope of the invention

I claim:

1. A shutter adjustable in length comprising, in combination, at least a pair of formed, louvered, planar members having spaced, parallel, lateral edges and relatively adjustable in assembled overlapped relation in the direction of said lateral edges, identical louvers formed in each of said members extending from the corresponding side thereof intermediate said lateral edges and transversely disposed thereto, the louvers of said members being identical and identically related to the planes of said members, the louvers within the overlapped member portions nesting in contiguous relation, the spacing between the louvers of a common member and each member being equal, said members being selectively assembled in any one of a plurality of overlapped relationships as to be adjustable in a direction parallel to said lateral edges and transverse to the longitudinal length of said louvers to vary the length of the shutter assembly producing a unitary shutter appearance.

2. A shutter, as in claim 1, wherein flanges depend from the lateral edges of said members, said flanges being disposed on the corresponding side of each member and transversely related to the general configuration of said members, the lateral edges and flanges of one of said members being spaced apart a distance sufficiently greater than the distance separating the lateral edges and flanges of the other member that the overlapping portion of the flanges of said other member are closely received within the overlapping portion of the flanges of said one member.

3. A shutter adjustable in length comprising, in combination, first and second formed sheet members having spaced, parallel, lateral edges and flanges depending from said lateral edges each on the corresponding side of the associated member, said members being assembled in overlapped relation and adjustable in a direction parallel to said lateral edges, the spacing between the flanges of said first member being sufficiently greater than the spacing between the flanges of said second member to closely receive said second member nested within the flanges of said first member, said members each including peripheral portions adjacent said lateral edges, said members each including a louvered portion intermediate said peripheral portions, the louvered portions of said members being identically related to the associated member peripheral portions, a plurality of louvers defined in said louvered portions on the corresponding side of each of said members, the louvers of said first and second members being identical in configuration and the spacing therebetween being equal, said louvers being transversely related to the lateral edges of the associated member and the overlapped portions of the louvers in the respective members being nested, with the overlapped peripheral portions upon said first and second members being in engagement in the desired selected assembly to provide the desired shutter length in the direction of said lateral edges producing a unitary shutter appearance.

References Cited in the file of this patent

UNITED STATES PATENTS

| | | |
|---|---|---|
| 1,616,297 | Alber | Feb. 1, 1927 |
| 1,659,786 | Sammet | Feb. 21, 1928 |
| 2,178,253 | Fader | Oct. 31, 1939 |
| 2,222,838 | Hammesfahr | Nov. 26, 1940 |